United States Patent
Ohrbom et al.

(10) Patent No.: US 6,740,706 B2
(45) Date of Patent: May 25, 2004

(54) METHOD FOR OBTAINING COATING COMPOSITIONS HAVING REDUCED VOC

(75) Inventors: Walter H. Ohrbom, Hartland Township, MI (US); Robert D. Weise, Harper Woods, MI (US); James A. Laugal, White Lake, MI (US)

(73) Assignee: BASF Corporation, Southfield, MI (US)

( * ) Notice: Subject to any disclaimer, the term of this patent is extended or adjusted under 35 U.S.C. 154(b) by 34 days.

(21) Appl. No.: 10/012,075

(22) Filed: Dec. 7, 2001

(65) Prior Publication Data

US 2003/0114590 A1 Jun. 19, 2003

(51) Int. Cl.$^7$ .................... C08L 33/04; C08L 67/00; C08L 75/04
(52) U.S. Cl. .................. 524/714; 524/721; 524/724; 524/736; 524/740; 524/741; 524/765; 524/766; 524/853; 524/871; 524/876; 524/877; 526/320; 526/328; 526/329.7; 528/76; 528/80; 528/85; 528/87; 528/272; 528/288
(58) Field of Search .................... 526/320, 328, 526/329.7; 528/76, 80, 85, 87, 272, 288; 524/714, 721, 724, 736, 740, 741, 765, 766, 853, 871, 878, 876

(56) References Cited

U.S. PATENT DOCUMENTS

| | | | |
|---|---|---|---|
| 4,118,427 A | 10/1978 | Rhein et al. | 568/852 |
| 4,246,376 A | 1/1981 | Didomenico, Jr. | 525/398 |
| 4,546,120 A | 10/1985 | Peerman et al. | 521/159 |
| 5,334,650 A | 8/1994 | Serdiuk et al. | 524/591 |
| 5,587,428 A | 12/1996 | Jones et al. | 525/165 |
| 5,688,867 A | 11/1997 | Scheibelhoffer et al. | 525/168 |
| 5,783,272 A | 7/1998 | Wong | 428/35.7 |
| 5,990,233 A | * 11/1999 | Barron | 524/67 |

FOREIGN PATENT DOCUMENTS

| | | | | |
|---|---|---|---|---|
| EP | 0 694 597 | | 7/1994 | ......... C09D/201/00 |
| EP | WO 96/23034 | | 8/1996 | ......... C09D/167/00 |
| WO | WO 95/19997 | | 7/1995 | ......... C08F/20/00 |
| WO | WO 96/23035 | | 8/1996 | ......... C09D/167/02 |
| WO | WO 99/35189 | | 7/1999 | |
| WO | WO 00/29451 | | 5/2000 | ......... C08G/2/22 |

OTHER PUBLICATIONS

Frank N. Jones, "End–Grafting of Oligoesters Based on Terephthalic Acid and Linear Diols for High Solids Coatings", Apr. 21, 1995, pp. 1609–1618.

Robson F. Storey et al., "Proceedings of the twenty–fourth international waterborne, high–solids, and powder coatings symposium", Feb. 5–7, 1997, pages title, & 1–21.

Frank N. Jones et al. "Recent studies of self–condensation and co–condensation of melamine–formaldehyde resins; cure at low temperatures", (1994), pp. 189–208.

Robson F. Storey et al., "Proceedings of the twenty–fourth international waterborne, high–solids, and powder coatings symposium", Feb. 21–23, 1990, pages title, & 447–470.

Shubang Gan et al, "Recent studies of the curing of polyerester–melamine enamels, possible causes of overbake softening", Feb. 1–3, 1989, pp. 87–109.

\* cited by examiner

*Primary Examiner*—Patricia A. Short

(57) ABSTRACT

The invention relates to an economical method of making a polymer having reduced VOCs and coating compositions containing such polymers. In one embodiment, the method of invention requires providing a reactant mixture (a), providing a solvent mixture (b) comprising a reactive component (c) which is substantially free of any heteroatoms and is not a crystalline solid at room temperature and comprises (i) from 12 to 72 carbon atoms, and (ii) at least two functional groups, and subjecting the reactant mixture (a) in the solvent mixture (b) to polymerization conditions sufficient to polymerize reactant mixture (a) to provide a mixture (d) of a polymer (a') in solvent mixture (b), wherein reactive component (c) under the polymerization conditions is substantially nonreactive: (1) with the components of reactive mixture (a), (2) in the polymerization of reactant mixture (a) and (3) with the polymer (a'). Coating compositions of the invention comprising polymers made by the disclosed method provide low VOCs without any reduction in application or performance properties.

34 Claims, No Drawings

METHOD FOR OBTAINING COATING COMPOSITIONS HAVING REDUCED VOC

FIELD OF THE INVENTION

The invention relates to the manufacture of thermosetting polymers and/or oligomers for use in curable coating compositions, especially curable coating compositions having a low or reduced VOC.

BACKGROUND OF THE INVENTION

Curable thermoset coating compositions are widely used in the coatings art. They are often used as topcoats in the automotive and industrial coatings industry. Such topcoats may be basecoats, clearcoats, or mixtures thereof. Color-plus-clear composite coatings are particularly useful as topcoats where exceptional gloss, depth of color, distinctness of image, or special metallic effect is desired. The automotive industry has made extensive use of these coatings for automotive body panels.

Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI). Finally, such composite coatings must also simultaneously provide a desirable balance of finished film properties such as durability, hardness, flexibility, and resistance to environmental etch, scratching, marring, solvents, and/or acids.

In order to obtain the extremely smooth finishes that are generally required in the coatings industry, coating compositions must exhibit good flow before curing. Good flow is observed when the coating composition is fluid enough at some point after it is applied to the substrate and before it cures to a hard film to take on a smooth appearance. Some coating compositions exhibit good flow immediately upon application and others exhibit good flow only after the application of elevated temperatures.

One way to impart fluid characteristics and good flow to a coating composition is to incorporate volatile organic solvents into the composition. These solvents provide the desired fluidity and flow during the coating process, but evaporate upon exposure to elevated curing temperatures, leaving only the coating components behind.

However, the use of such solvents increases the volatile organic content (VOC) of the coating composition. Because of the adverse impact that volatile organic solvents have on the environment, many government regulations impose limitations on the amount of solvent that can be used. Increasing the percentage nonvolatile (% NV) of a coating composition or decreasing the VOC provides a competitive advantage with respect to environmental concerns, air permitting requirements and cost.

Prior art attempts to improve the VOC of polymers and coating compositions have generally focused on the removal of volatile organic solvents from polymers by methods such as vacuum distillation. However, such techniques have significant disadvantages. First, they generally require the use of more energy and labor which leads to higher costs. Increased costs also result from the disposal of removed solvent. Finally, the viscosity of the stripped polymer often creates processing and manufacturing challenges.

There is thus a continuing desire to reduce the volatile organic content (VOC) of coating compositions and the components of such coating compositions while avoiding the problems of the prior art. This must be done without sacrificing the rheological properties of the coating composition required for trouble-free application of the composition while still maintaining the optimum level of smoothness and appearance. Finally, any such coating composition must continue to provide finished films having a good combination of properties with respect to durability, hardness, flexibility, and resistance to chipping, environmental etch, scratching, marring, solvents, and/or acids.

More particularly, it would be very desirable to provide a method of making film-forming components for coating compositions wherein the film-forming component is polymerized in a material which is inert with respect to polymerization but does not volatilize upon exposure to elevated curing temperature. Ideally, such a material would enter into the film-forming reaction of a thermosetting coating composition incorporating said film-forming component. The desired effect of incorporating the material into the final film would be to increase the crosslink density of the coating and to impart positive film attributes such as etch resistance, flexibility, scratch and mar, chip resistance.

Accordingly, it is an object of the instant invention to provide a method of making binders for curable coating compositions which provide all of the advantages of prior art binders, but that contribute lower levels of volatile organic solvents to the final coating composition while still providing desirable application properties as well as finished films having commercially acceptable appearance and performance properties.

It is another object of the invention to provide a method of making acrylic oligomers and/or polymers for curable coating compositions which provide all of the advantages of prior art acrylic oligomers and binders, but that contribute lower levels of volatile organic solvents to the final coating composition while still providing desirable application properties as well as finished films having commercially acceptable appearance and performance properties.

It is another object of the invention to provide a method of making film-forming components for curable coating compositions wherein the film-forming component is polymerized in a material which (1) is inert with respect to polymerization, (2) does not contribute to the VOC of a coating composition incorporating said film-forming component, and (3) enters into the film-forming reaction when the coating composition is cured.

SUMMARY OF THE INVENTION

These and other objects have been achieved with the methods and coating compositions of the invention.

In one embodiment, the method of invention requires providing a reactant mixture (a), providing a solvent mixture (b) comprising a reactive component (c) which is substantially free of any heteroatoms and is not a crystalline solid at room temperature and comprises (i) from 12 to 72 carbon atoms, and (ii) at least two functional groups, and subjecting the reactant mixture (a) in the solvent mixture (b) to polymerization conditions sufficient to polymerize reactant mixture (a) to provide a mixture (d) of a polymer (a') in solvent mixture (b), wherein reactive component (c) under the polymerization conditions is substantially nonreactive: (1) with the components of reactive mixture (a), (2) in the polymerization of reactant mixture (a) and (3) with the polymer (a').

In another embodiment of the invention, a method of making an acrylic polymer is provided, comprising providing a reactant mixture (a) comprising one or more ethylenically unsaturated monomers having at least one carbon—carbon double able to undergo free radical polymerization, providing a solvent mixture (b) comprising a reactive component (c) which is substantially free of any heteroatoms and is not a crystalline solid at room temperature and comprises (i) from 12 to 72 carbon atoms, and (ii) at least two functional groups, and subjecting the reactant mixture (a) in the solvent mixture (b) to polymerization conditions sufficient to polymerize reactant mixture (a) to provide a mixture (d) of a polymer (a') in solvent mixture (b), wherein reactive component (c) under the polymerization conditions is substantially nonreactive: (1) with the components of reactive mixture (a), (2) in the polymerization of reactant mixture (a) and (3) with the polymer (a').

The invention also provides curable coating compositions, comprising a mixture (d) comprising a polymer (a') and a solvent mixture (b) and at least one crosslinking agent (e). Mixture (d) is made by the process comprising providing a reactant mixture (a), providing a solvent mixture (b) comprising a reactive component (c) which is substantially free of any heteroatoms and is not a crystalline solid at room temperature and comprises (i) from 12 to 72 carbon atoms, and (ii) at least two functional groups, and subjecting the reactant mixture (a) in the solvent mixture (b) to polymerization conditions sufficient to polymerize reactant mixture (a) to provide a mixture (d) of a polymer (a') in solvent mixture (b), wherein reactive component (c) under the polymerization conditions is substantially nonreactive: (1) with the components of reactive mixture (a), (2) in the polymerization of reactant mixture (a) and (3) with the polymer (a'). The at least one crosslinking agent (e) comprises at least one functional group (i) which is reactive with reactive component (c).

Coating compositions of the invention comprising crosslinking agent (e) and mixture (d) of polymer (a') and reactive component (c) made by the disclosed method provide coating compositions having low or reduced VOCs without any reduction in application or performance properties.

DETAILED DESCRIPTION OF THE INVENTION

The invention provides a method a making a polymer (a'), especially a mixture (d) of polymer (a') in a solvent mixture (b) comprising at least one reactive component (c). The mixture (d) of polymer (a') in a solvent mixture (b) is especially suitable for use in coating compositions having low VOCs.

'Low VOC polymer or coating composition' as used herein refers to polymers or coating compositions having a VOC of no more than 3.2 lbs. of volatile organic solvent/gallon of polymer or coating composition, more preferably no more than 2.4 lbs. of volatile organic solvent/gallon of polymer or coating composition, and most preferably no more than 1.6 lbs. of volatile organic solvents/gallon of polymer or coating composition.

Polymer (a') is provided in a mixture (d) in combination with a solvent mixture (b). Polymer (a') results from the polymerization of reactant mixture (a) comprising one or more components. Solvent mixture (b) comprises a particular reactive additive or component (c) that must be substantially inert with respect to three things under the polymerization conditions to which reactant mixture (a) is subjected. "Substantially inert" as used herein refers to a degree of reaction between the reactive additive component (c) and the reaction mixture (a) of less than 3% of the total functionality of (c), preferably less than 2%, and most preferably less than 1% of the total functionality of reactive additive (c). In a most preferred embodiment, any reaction between reactive additive (c) and reaction mixture (a) will be attributable solely to the presence of unwanted impurities and/or contaminants in reactive additive (c).

First, the reactive component (c) must be substantially inert or nonreactive with the components of reactant mixture (a) under the polymerization conditions. Thus, reactive component (c) must generally be free of any functional groups which might be reactive with one or more functional groups of the components of reactant mixture (a) under the conditions used to polymerize reactant mixture (a). Functional groups (ii) of reactive component (c) will normally be free of any groups that are reactive with one or more functional groups of the components of reactant mixture (a) under conditions used to polymerize reactant mixture (a).

Second, the reactive component (c) must be substantially inert or nonreactive during the polymerization of reactant mixture (a). That is, reactive component (c) may not polymerize under the polymerization conditions which result in the transformation of reactant mixture (a) into polymer (a').

Finally, the reactive component (c) must be substantially inert or nonreactive with the resulting polymer (a') while under the polymerization conditions used to polymerize reactant mixture (a). For example, if an epoxy functional component and an acid functional component are polymerized to provide an epoxy upgrade polymer, the reactive component (c) may not have any functional groups reactive with the secondary hydroxyl formed by the ring opening of the oxirane functional group.

Put another way, the functional groups (ii) of reactive component (c) are limited to those functional groups which may be on one or more components of reactant mixture (a) but which do not enter into the polymerization of reactant mixture (a) or any graft polymerization processes involving reactant mixture (a) or polymer (a').

Polymer (a') may be any polymer, oligomer or mixture thereof, resulting from the polymerization of reactant mixture (a). As used herein 'polymer (a') may generally have a number average molecular weight of from 400 to 50,000 Daltons. Usually, the polymer (a') will have a number average molecular weight of from 1000 to 50,000 Daltons. Polymer (a') may be an acrylic polymer, a polyurethane polymer, a polyester polymer, an epoxy upgrade polymer, a dendrimer polymer, or the like. Polymer (a') will preferably be an acrylic polymer, a polyurethane polymer, or a polyester polymer. Most preferably, polymer (a') will be an acrylic polymer or a polyurethane polymer, with acrylic polymers being especially preferred.

It will be appreciated that the composition of reactant mixture (a) will depend upon the desired type of polymer (a'). In general, reactant mixture (a) will be comprised of one or more components, preferably two or more components that can be subjected to polymerization conditions to produce a polymer (a'). More preferably the component of reactant mixture (a) will be monomers or compounds that can react with each other and/or compounds produced therefrom, to provide a polymer of increased molecular weight relative to the initial starting reactants of mixture (a).

If polymer (a') is an acrylic polymer, reactant mixture (a) will be comprised of ethylenically unsaturated monomers having at least one carbon—carbon double bond able to undergo free radical polymerization.

Illustrative ethylenically unsaturated monomers include, without limitation, alpha, beta-ethylenically unsaturated monocarboxylic acids containing 3 to 5 carbon atoms such as acrylic, methacrylic, and crotonic acids, and the esters, nitriles, and amides of those acids; alpha, beta-ethylenically unsaturated dicarboxylic acids containing 4 to 6 carbon atoms and the anhydrides, monoesters, and diesters of those acids; vinyl esters, vinyl ethers, vinyl ketones, and aromatic or heterocylic aliphatic vinyl compounds. Carbamate functional ethylenically unsaturated monomers, cyclic carbonate functional ethylenically unsaturated monomers, and/or isocyanate functional ethylenically unsaturated monomers may also be used, most preferably in combination with other ethylenically unsaturated monomers.

Representative examples of suitable esters of acrylic methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cycolhexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol.

Representative examples of polymerizable vinyl monomers include, without limitation, such compounds as vinyl acetate, vinyl propionate, vinyl ethers such as vinyl ethyl ether, vinyl and vinylidene halides, and vinyl ethyl ketone.

Representative examples of aromatic or heterocylic aliphatic vinyl compounds include, without limitation, such compounds as styrene, alpha-methyl styrene, vinyl toluene, tert-butyl styrene, and 2-vinyl pyrrolidone.

Representative examples include acrylic and methacrylic acid amides and aminoalkyl amides; acrylonitrile, and methacrylonitriles.

Other suitable examples include acrylates or methacrylates having hydroxy, epoxy, or other functional groups, such as hydroxyalkyl acrylates and methacrylates, glycidyl esters of methacrylic and acrylic acid such as glycidyl methacrylate, and aminoalkyl esters of methacrylic or acrylic acid like N,N-dimethylaminoethyl (meth)acrylate.

Acrylic monomers having carbamate functionality in the ester portion of the monomer are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

Ethylenically unsaturated isocyanate monomers are well-known in the art and include meta-isopropenyl-.alpha.alpha.-dimethylbenzyl isocyanate (sold by American Cyanamid as TMI®) and isocyanatoethyl methacrylate.

Cyclic carbonate ethylenically unsaturated monomers are well-known in the art and include (2-oxo-1,3-dioxolan-4-yl)methyl methacrylate.

When polymer (a') is an acrylic resin, it will generally have a number average molecular weight of from 1000 to 50,000, preferably from 10,000 to 25,000, with molecular weights of from 15,000 to 20,000 being most preferred.

In a preferred embodiment, polymer (a') will be a hydroxyl or carbamate functional resin which may or may not be water dispersible. For example, in one preferred embodiment, polymer (a') will be a water dispersible acrylic polymer having a hydroxyl equivalent weight of from 250 to 1500 g/mole and an acid equivalent weight of from 500 to 3000 g/mole. In another preferred embodiment, the polymer (a') will be a water dispersible acrylic polymer having a carbamate equivalent weight of from 250 to 1500 g/mole and an acid equivalent weight of from 500 to 3000 g/mole. In another preferred embodiment, the polymer (a') is an acrylic polymer having a hydroxyl equivalent weight of from 250 to 1500 g/mole and an acid equivalent weight greater than 3000 g/mole. Finally, in another preferred embodiment, the polymer (a') is an acrylic polymer having a carbamate equivalent weight of from 250 to 1500 g/mole and an acid equivalent weight greater than 3000 g/mole.

If polymer (a') is a polyester, reactant mixture (a) will be comprised of a mixture of at least one polycarboxylic acid and/or anhydride, and at least one polyol and/or epoxide. Such reactants will be subjected to polymerization via esterification.

The polycarboxylic acids used to prepare the polyester polymer (a') consist primarily of monomeric polycarboxylic acids or anhydrides thereof having 2 to 18 carbon atoms per molecule. Among useful acids are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester polymer (a') include diols such as alkylene glycols. Specific examples include ethylene glycol, 1,6-hexanediol, neopentyl glycol, and 2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component of reactant mixture (a) can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1. Limited amounts of monofunctional alcohols, such as ethylhexanol, may also be used.

Polyurethane polymers (a') may be prepared by the polymerization of a reactant mixture (a) comprising at least one di- and/or polyisocyanate and at least one polyol. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like include in reactant mixture (a).

For example, suitable polyisocyanates can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylenediisocyanate and para-xylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of $\alpha'$, $\alpha'$, $\alpha'$, $\alpha'$-tetramethyl xylylene diisocyanate can be used. Also useful as the polyisocyanate are isocyanurates such as DESMODUR® N 3300 from Mobay and biurets of isocyanates such as DESMODUR® N100 from Mobay.

Active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. Both primary and secondary amine groups are considered as having one active hydrogen. Active hydrogen-containing chain extension agents also include water. In a preferred embodiment of the invention, a polyol is used as the chain extension agent, to provide a polyurethane. In an especially preferred embodiment, a diol is used as the chain extension agent with little or no higher polyols, to minimize branching. Examples of preferred diols which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

Monofunctional capping alcohols such as 2-ethylhexanol may also be used. The mono- or polyfunctional alcohol may contain additional functional groups. Non-limiting examples are glycidol, hydroxyalkylcarbamates such as hydroxy ethyl carbarnate or hydroxy butyl carbarnate, and hydroxy acids such as 1-hydroxybutylic acid.

The polyurethane polymer may be chain extended in any manner using these compounds having at least two active hydrogen groups. Accordingly, reactant mixture (a) may thus include such compounds with a mixture of polyisocyanate, polyol, and multi-functional compounds.

It is an aspect of the invention that the reactant mixture (a) is polymerized in a solvent mixture (b).

Solvent mixture (b) will comprise a reactive component (c) which is substantially free of any heteroatoms and is not a crystalline solid at room temperature and comprises (i) from 12 to 72 carbon atoms, and (ii) at least two functional groups. The non-functional part of reactive component (c) of the invention will generally have from 12 to 72 carbons, more preferably from 18 to 54 carbons, and most preferably from 36 to 54 carbons. In a particularly preferred embodiment of the invention, the nonfunctional part of reactive component (c) will have 36 carbons.

"Heteroatoms" as used herein refers to atoms other than carbon or hydrogen. The phrase "substantially without" heteroatoms as used herein means that the portion of reactive component (c) which does not include functional groups (ii) will generally have no more than two atoms which are other than carbon or hydrogen, i.e., atoms such as N, O, Si, mixtures thereof, and the like. More preferably, that portion of reactive component (c) that does not include functional groups (ii) will have no more than one atom that is other than carbon or hydrogen. In a most preferred embodiment, that portion of reactive component (c) that does not include functional groups (ii) will have no heteroatoms, i.e., will consist solely of carbon and hydrogen atoms. Thus, in a most preferred aspect of the invention, the only heteroatoms in reactive component (c) will be present in functional groups (ii).

It is another aspect of the invention that reactive component (c) will not be a crystalline solid at room temperature, i.e., at temperatures of from 65 to 75° F. "Crystalline" refers to a solid characterized by a regular, ordered arrangement of particles. Rather, reactive component (c) will be an amorphous solid, a wax or a liquid at room temperature. "Amorphous" refers to a noncrystalline solid with no well-defined ordered structure.

In a more preferred embodiment of the invention, reactive component (c) will comprise a mixture of two or more saturated or unsaturated structures selected from the group consisting of noncyclic structures for reactive component (c), aromatic-containing structures for reactive component (c), cyclic-containing structures for reactive component (c), and mixtures thereof. Saturated structures are preferred, especially where durability issues are of concern. For example, a most preferred reactive component (c) will comprise a mixture of two or more structures selected from the group consisting of aliphatic structures for reactive component (c), aromatic-containing structures for reactive component (c), cycloaliphatic-containing structures for reactive component (c), and mixtures thereof.

It is particularly preferred that reactive component (c) comprise at least two, more preferably three, of the three cited structures. If reactive component (c) comprises only two of the three cited structures for reactive component (c), then at least one of the two structures must be present as a mixture of two or more isomers thereof.

For example, the mixture of reactive components (c) may comprise at least one aliphatic structure for reactive component (c) and at least one other structure for reactive component (c) selected from the group consisting of aromatic-containing structures for reactive component (c), cycloaliphatic-containing structures for reactive component (c), and mixtures thereof. If the 'at least one other structure for reactive component (c)' is not a mixture of aromatic-containing structures for reactive component (c) and cycloaliphatic-containing structures for reactive component (c), either the aromatic-containing structures or the cycloaliphatic containing structures must be present as a mixture of two or more isomers.

Alternatively, the mixture of reactive components (c) may comprise at least one aromatic-containing structure for reactive component (c) and at least one other structure for reactive component (c) selected from the group consisting of aliphatic structures for reactive component (c), cycloaliphatic-containing structures for reactive component (c), and mixtures thereof. If the 'at least one other structure for reactive component (c)' is not a mixture of aliphatic structures for reactive component (c) and cycloaliphatic-containing structures for reactive component (c), either the aliphatic structures or the cycloaliphatic containing structures must be present as a mixture of two or more isomers.

In a most preferred embodiment, reactive component (c) will comprise one or more aliphatic structures for reactive component (c), one or more aromatic-containing structures for reactive component (c), and one or more cycloaliphatic-containing structures for reactive component (c). Particularly advantageous mixtures of reactive component (c) will comprise from 3 to 25% by weight of reactive component (c) having an aliphatic structure, from 3 to 25% by weight of reactive component (c) having an aromatic-containing structure, and 50 to 94% by weight of reactive component (c) having a cycloaliphatic-containing structure. More preferred mixtures of reactive component (c) will comprise from 3 to 18% by weight of reactive component (c) having an aliphatic structure, from 5 to 23% by weight of reactive component (c) having an aromatic-containing structure, and 55 to 85% by weight of reactive component (c) having a cycloaliphatic-containing structure. Most preferred mixtures of reactive component (c) will comprise from 5 to 10% by weight of reactive component (c) having an aliphatic structure, from 10 to 20% by weight of reactive component (c) having an aromatic-containing structure, and 60 to 70% by weight of reactive component (c) having a cycloaliphatic-containing structure.

Finally, reactive component (c) must comprise at least two functional groups (ii) per molecule. Preferred reactive components (c) may have from two to six functional groups (ii) while most preferably reactive component (c) will have two to three functional groups (ii).

Functional groups (ii) may be selected from a variety of active hydrogen containing groups and groups reactive with such active hydrogen containing groups. Examples of illustrative functional groups are hydroxy, isocyanate (blocked or unblocked), epoxy, carbamate, aminoplast, aldehyde, acid, epoxy, amine, cyclic carbonate, urea, mixtures thereof, and the like.

In a most preferred embodiment, functional group (ii) will be any one of a pair of reactants that would result in a thermally irreversible chemical linkage. The term "thermally irreversible linkage" refers to a linkage the reversal of which is not thermally favored under the traditional cure schedules used for automotive coating compositions. Illustrative examples of suitable thermally irreversible chemical linkages are urethanes, ureas, esters and ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins.

It will be appreciated that if one member of a "pair" is selected for use as functional group (ii), the other member of the "pair" will generally be selected as functional group (ei) of crosslinking agent (e) discussed below. Examples of illustrative reactant "pairs" are hydroxy/isocyanate (blocked or unblocked), hydroxy/epoxy, carbamate/aminoplast, carbarnate/aldehyde, acid/epoxy, amine/cyclic carbonate, amine/isocyanate (blocked or unblocked), urea/aminoplast, and the like.

Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof, with primary carbamate groups being particularly preferred.

Illustrative examples of suitable reactive components (c) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12-18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniqema of Wilmington, Del.

Hydroxyl functional reactive components (c) are commercially available as the Pripol™ saturated fatty acid dimer (Pripol™ 2033) supplied by Uniqema of Wilmington, Del. Hydroxyl functional reactive components (c) may also be obtained by reduction of the acid group of the above-discussed fatty acids.

Reactive components (c) having two or more carbamate functional groups may be obtained via the reaction of the hydroxyl functional reactive components (c) with a low molecular weight carbamate functional monomer such as methyl carbamate under appropriate reaction conditions. Alternatively, carbamate functional reactive components (c) may be made via decomposition of urea in the presence of hydroxyl functional reactive component (c) as described above. Finally, carbamate functional reactive components (c) can be obtained via the reaction of phosgene with the hydroxyl functional reactive component (c) followed by reaction with ammonia.

Amine groups suitable for use as functional group (ii) may be primary or secondary, but primary amines are most preferred. Reactive components (c) having amine functional groups (ii) may be obtained via reaction of the acid functional component (c) to form an amide, followed by conversion to a nitrile and subsequent reduction to an amine Reactive components (c) having isocyanate functional groups (ii) may be obtained via reaction of the amine functional component (c) described above with carbon dioxide.

Aminoplast functional groups may be defined as those functional groups resulting from the reaction of an activated amine group and an aldehyde or formaldehyde. Illustrative activated amine groups are melamine, benzoguanamine, amides, carbamates, and the like. The resulting reaction product may be used directly as functional group (ii) or may be etherified with a monofunctional alcohol prior to use as functional group (ii).

Reactive components (c) having aminoplast functional groups (ii) may be made via reaction of carbamate functional reactive component (c) as described above with formaldehyde or aldehyde. The resulting reaction product may optionally be etherified with low boiling point alcohols.

Reactive components (c) having aldehyde functional groups (ii) may be made via reduction of the acid functional reactive components (c) described above.

Reactive components (c) having urea functional groups (ii) may be made via reaction of an amine functional component (c) with urea. Alternatively, amine functional component (c) can be reacted with phosgene followed by reaction with ammonia to produce the desired urea functional groups (ii).

Reactive components (c) having epoxy functional groups (ii) may be made using either saturated or unsaturated fatty acids described above. If an unsaturated fatty acid is used, reaction with peroxide will form internal epoxy groups. More preferably, an acid or hydroxyl functional reactive component (c) will be reacted with epichlorohydrin. Preferred epoxy functional reactive components (c) will be obtained using saturated starting materials.

Reactive components (c) having cyclic carbonate functional groups (ii) may be made via carbon dioxide insertion into an epoxy functional reactive component (c) as described above.

A preferred example of for reactive component (c) will have the following structures therein:

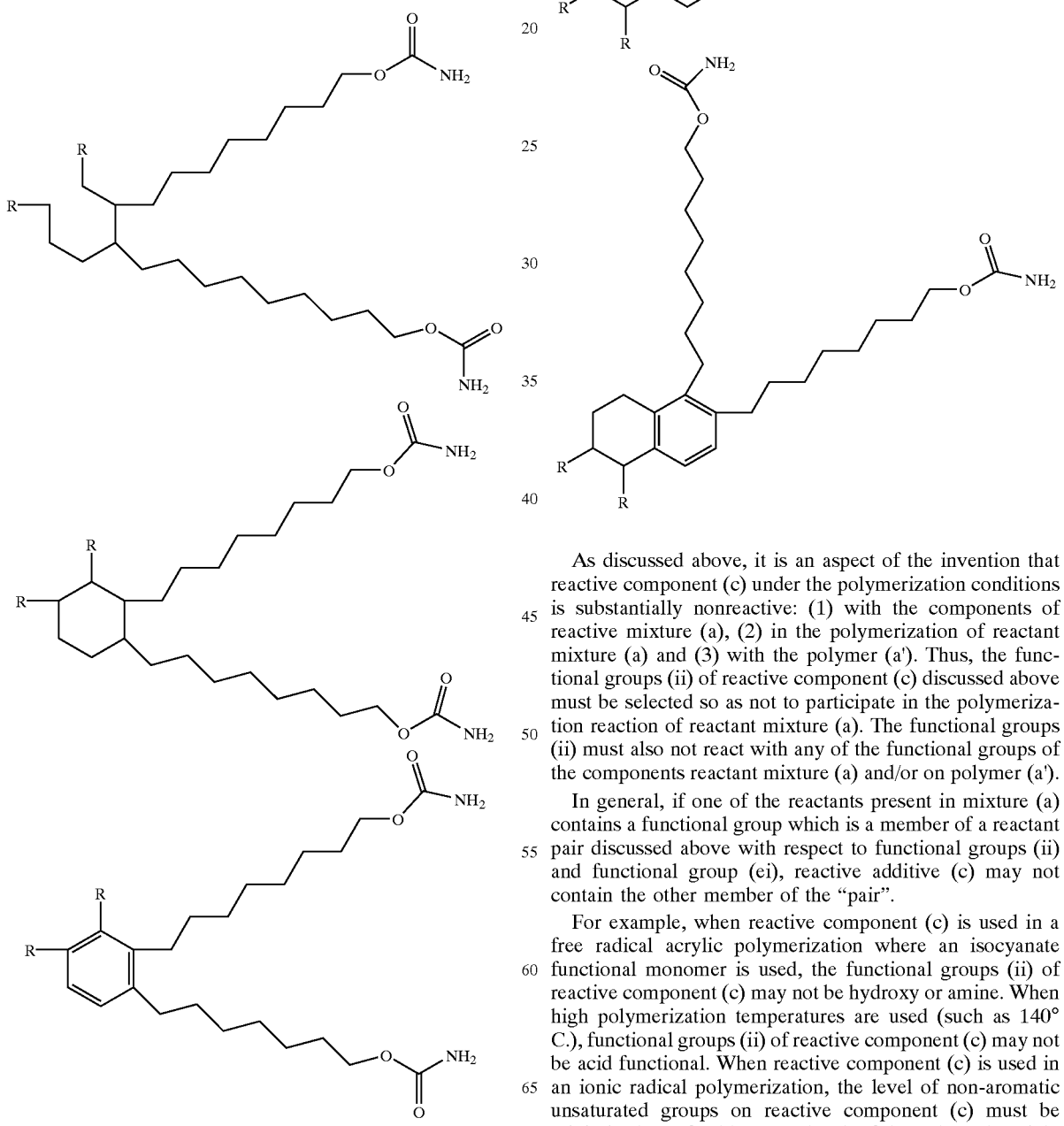

As discussed above, it is an aspect of the invention that reactive component (c) under the polymerization conditions is substantially nonreactive: (1) with the components of reactive mixture (a), (2) in the polymerization of reactant mixture (a) and (3) with the polymer (a'). Thus, the functional groups (ii) of reactive component (c) discussed above must be selected so as not to participate in the polymerization reaction of reactant mixture (a). The functional groups (ii) must also not react with any of the functional groups of the components reactant mixture (a) and/or on polymer (a').

In general, if one of the reactants present in mixture (a) contains a functional group which is a member of a reactant pair discussed above with respect to functional groups (ii) and functional group (ei), reactive additive (c) may not contain the other member of the "pair".

For example, when reactive component (c) is used in a free radical acrylic polymerization where an isocyanate functional monomer is used, the functional groups (ii) of reactive component (c) may not be hydroxy or amine. When high polymerization temperatures are used (such as 140° C.), functional groups (ii) of reactive component (c) may not be acid functional. When reactive component (c) is used in an ionic radical polymerization, the level of non-aromatic unsaturated groups on reactive component (c) must be minimized, preferably to a level of less than 5 weight percent, more preferably less than 2 weight percent, based on the total weight of reactive component (c).

When the reactive component (c) is used in a urethane polymerization, functional groups (ii) must not contain any groups that would react with the isocyanate or active proton source (usually hydroxy). The typical functional groups on reactive component (c) that should be avoided in this case are hydroxy and amine groups. Other functional groups on reactive component (c) might also have to be avoided depending on the nature of any functional groups on the active hydrogen material. For example, if glycidol is used as a capping group in the urethane polymerization, the reactive component (c) must be free of acid groups.

When the reactive component (c) is used in a polyester polymerization, functional groups (ii) may not groups that will react with anhydrides, acids, and alcohols. Examples of such groups to be avoided include acids, hydroxy, epoxy, unblocked isocyanates and the like. In such as case, non-limiting examples of functional groups (ii) of reactive component (c) would be carbamate, vinyl or mixtures thereof.

Finally, it is within the scope of the invention that reactive component (c) may have functional groups that are also reactive with polymer (a') when exposed to cure conditions, but are inert during polymerization conditions. A non-limiting example of this would be use of a ketamine functionalized reactive component (c) with an epoxy, cyclic carbonate and/or isocyanate functional acrylic polymer.

In addition to reactive additive (c), solvent mixture (b) may further comprise other solvents and/or cosolvents such as water and/or organic solvents. Illustrative solvents include aromatic hydrocarbons, such as, petroleum naphtha or xylenes, ketones such as methyl amyl ketone, methyl isobutyl ketone, methyl ethyl ketone or acetone; esters such as butyl acetate or hexyl acetate; and glycol ether esters, such as propylene glycol monomethyl ether acetate. Other examples of useful solvents include, without limitation, m-amyl acetate, ethylene glycol butyl ether-acetate, xylene, N-methylpyrrolidone, blends of aromatic hydrocarbons, and mixtures of these.

In general, solvent mixture (b) will comprise from 0 to 95% by weight of reactive additive (c), more preferably from 0 to 75% by weight, and most preferably from 0 to 20% by weight, all based on the total weight of solvent mixture (b).

Coating compositions of the invention will comprise mixture (d) made by the method of the invention wherein mixture (d) comprises polymer (a') and solvent mixture (b). Coating compositions of the invention may further comprise other known film-forming binders not made by the method of the invention, but most preferably will not. Illustrative examples include acrylic polymers, polyurethane polymers, polyester polymers, epoxy functional polymers, mixtures thereof, and the like.

In general, coating compositions of the invention will comprise mixture (d) having from 10 to 90% by weight nonvolatile of polymer (a'), more preferably from 20 to 80% by weight nonvolatile of polymer (a') and most preferably from 40 to 60% by weight nonvolatile of polymer (a'), based on the total weight of mixture (d).

For the coating compositions of the invention, solvent mixture (b) will generally have from 5 to 100% by weight of reactive additive (c), more preferably from 30 to 100% by weight of reactive additive (c), and most preferably from 80 to 100% by weight of reactive additive (c), all based on the total weight of solvent mixture (b).

Coating compositions of the invention will also comprise at least one crosslinking agent (e). Crosslinking agent (e) will comprise at least one functional group (ei) that is reactive with reactive component (c). Crosslinking agent (e) may further comprise additional functional groups (eii) that are reactive with the functional groups of polymer (a'). Alternatively, the coating compositions of the invention may further comprise an additional crosslinking agent (f) comprising functional groups reactive with polymer (a'). In a preferred embodiment, the coating compositions of the invention will comprise at least one crosslinking agent (e) having both functional groups (ei) and (eii).

Illustrative examples of at least one crosslinking agent (e) are those crosslinking agents having one or more crosslinkable functional groups. Such groups include, for example, aminoplast, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, activated methylene and acetoacetate groups. Preferred crosslinking agents will have crosslinkable functional groups that include hydroxy functional groups and amino functional groups and isocyanate groups. Di- and/or polyisocyanates and/or aminoplast resins are most preferred for use as crosslinking agents in coating compositions comprising the mixture (d') of the invention. Mixed crosslinkers may also be used.

For example, when the reactive additive (c) comprises hydroxy functional groups, for example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

In a more preferred embodiment, the crosslinker (e) will have functional groups (ei), that will react with the functional group on (c) to form a crosslink that is non-reversible under cure conditions. This will help to insure that the reactive additive remains crosslinked in the film. Some non-limiting examples of crosslinkable functional groups pairs that fall under this category are: carbamate:aminoplast, hydroxy:epoxy, acid:epoxy, vinyl:vinyl, and hydroxy:isocyanate. An example of a crosslink that is reversible under cure conditions is hydroxy:aminoplast, and hydroxy:activated methylene.

The coating compositions of the invention are particularly suitable for use in automotive coating compositions, especially primers, basecoats, and/or clearcoats, with clearcoats being especially preferred. The coating compositions of the invention may be powder coatings, waterborne, power slurry, or solventborne.

Coating compositions of the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When such coating compositions are used as topcoat coatings, they preferably have a 20 degree gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating.

Coating compositions of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like.

In a preferred embodiment, the coating composition of the present invention is the clearcoat of a color-plus-clear composite coating. The clearcoat may be applied over a color coat according to the invention or may be applied over a color coat of a formulation already known in the art. Pigmented color coat or basecoat compositions for such composite coatings are well known in the art and do not require explanation in detail herein. Polymers known in the art to be useful in basecoat compositions include acrylics, vinyls, polyurethanes, polycarbonates, polyesters, alkyds, and polysiloxanes. Such basecoats may comprise the polymer (a') of the invention. Preferred polymers include acrylics and polyurethanes.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may also be incorporated into the coating compositions of the invention. The amount of these materials used must be controlled to achieve the desired performance properties and/or to avoid adversely affecting the coating characteristics.

Coating compositions can be coated onto an article by any of a number of techniques well known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

Coating compositions of the invention are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93 degree C. and 177 degree C. In a preferred embodiment, the cure temperature is between 135 degree C. and 165 degree C. In another preferred embodiment, a blocked acid catalyst is included in the composition and the cure temperature is between 115 dgree C. and 140 degree C. In a different preferred embodiment, an unblocked acid catalyst is included in the composition and the cure temperature is between 80 degree C. and 100 degree C. The curing time will vary depending on the particular components used and physical parameters, such as the thickness of the layers. Typical curing times range from 15 to 60 minutes, and preferably 15–25 minutes at the target temperature.

EXAMPLES

Preparation of a Hydroxy/Acid Functional Acrylic Resin According to the Invention 1400 parts of the dicarbamate of Pripol™ 2033 (a fatty acid dimer diol supplied by Uniqema) was heated under an inert atmosphere to 140° C. Then a mixture of 156.8 parts of hydroxyethyl methacrylate, 213.5 parts of ethylhexyl methacrylate, 140.0 parts of butyl methacrylate, 49.7 parts of methacrylic acid, 140.0 parts of lauryl methacrylate and 17.5 parts of t-butyl peracetate was added over three hours. The reaction temperature was then cooled to 110° C. and 10.4 parts of a 50% mixture of t-butyl peroctoate added over 10 minutes. The resulting resin solution was then held at 110° C. for one hour. It was then cooled to room temperature to form a waxy solid with a measured (110° C. for one hour) NV of 96.8%.

Preparation of Paint Sample (29710-1-203)

72.3 parts of the above mixture was heated to 43° C. 5.2 parts of a solution containing 19 parts of 2-amino2-methyl propanol and 81 parts deionized water was added to the molten resin mixture. 74 parts deionized water was then added to yield a secondary dispersion. To this, 39.7 parts of a crosslinker/additive premix containing 76.9 parts Resimene 747(hexamethoxymethyl melamine supplied by Cytec), 10.3 parts Nacure 5543 (solution of blocked DDBSA supplied by King Industries), 5.1 parts Tinuvin 384 (supplied by Ciba Specialty Chemicals), 2.6 parts Tinuvin 123 (supplied by Ciba Specialty Chemicals), and 5.1 parts BYK 345 was added. The sample was adjusted to spray viscosity with 10.7 parts deionized water and 0.4 parts Acrysol RM-8. The % weight NV(theo) was 52.7. The VOC of the composition was 0.43 lbs of volatile organic solvent per gallon of total coating composition.

The sample was sprayed over a black waterborne basecoat, and baked for 20 minutes at 275° F. (metal temperature). The resulting painted panel had excellent appearance. The panel was tested for environmental etch resistance (acid rain) in Jacksonville, Fla. After 14 weeks exposure, the panel received a 6 rating on an etch rating scale wherein 1 is the best rating and 10 the worst.

The etch rating is described as such:

| Rating | Description |
| --- | --- |
| 0 to 3 | The etch would be very slight and only noticed by a trained observer. |
| 4 to 6 | The etch would be slight to moderate, and in some cases noted by a vehicle owner (untrained observer). |
| 7 to 10 | The etch is severe enough where many vehicle owners would notice and complain. |

We claim:
1. A method of making a polymer, comprising
providing a reactant mixture (a) comprising one or more components,
providing a solvent mixture (b) comprising a reactive component (c) which is substantially free of any heteroatoms and is not a crystalline solid at room temperature and comprises (i) a nonfunctional part comprising from 18 to 72 carbon atoms, and (ii) at least two functional groups, and subjecting the reactant mixture (a) in the solvent mixture (b) to polymerization conditions sufficient to polymerize reactant mixture (a) to provide a mixture (d) of a polymer (a') in solvent mixture (b), wherein reactive component (c) under the polymerization conditions is substantially nonreactive: (1) with the components of reactive mixture (a), (2) in the polymerization of reactant mixture (a) and (3) with the polymer (a').

2. The method of claim 1 wherein reactant mixture (a) comprises components for making a polymer selected from the group of acrylic polymers, polyurethane polymers, polyester polymers, and epoxy upgrade polymers.

3. The method of claim 2 wherein reactant mixture (a) comprises a mixture of ethylenically unsaturated monomers having at least one carbon—carbon double bond able to undergo free radical polymerization.

4. The method of claim 3 wherein reactant mixture (a) comprises a mixture of ethylenically unsaturated monomers able to undergo free radical polymerization selected from the group consisting of acid functional ethylenically unsaturated monomers, epoxy functional ethylenically unsaturated monomers, isocyanate functional ethylenically unsaturated monomers, nonfunctional ethylenically unsaturated monomers, hydroxyl functional ethylenically unsaturated monomers, and mixtures thereof.

5. The method of claim 4 wherein the polymer (a') is an acrylic polymer.

6. The method of claim 5 wherein the polymer (a') is a water dispersible acrylic polymer having a hydroxyl equivalent weight of from 250 to 1500 g/mole and an acid equivalent weight of from 500 to 3000 g/mole.

7. The method of claim 5 wherein the polymer (a') is a water dispersible acrylic polymer having a carbamate equivalent weight of from 250 to 1500 g/mole and an acid equivalent weight of from 500 to 3000 g/mole.

8. The method of claim 5 wherein the polymer (a') is an acrylic polymer having a hydroxyl equivalent weight of from 250 to 1500 g/mole and an acid equivalent weight greater than 3000 g/mole.

9. The method of claim 5 wherein the polymer (a') is an acrylic polymer having a carbamate equivalent weight of from 250 to 1500 g/mole and an acid equivalent weight greater than 3000 g/mole.

10. The method of claim 4 wherein the polymer (a') is a polyurethane polymer.

11. The method of claim 10 wherein the polymer (a') is a carbamate functional polyurethane polymer.

12. The method of claim 1 wherein reactive component (c) is a liquid or a waxy solid at temperatures of less than 20 degrees C.

13. The method of claim 1 wherein reactive component (c) comprises a mixture selected from the group consisting of aliphatic compounds, aromatic containing compounds, cycloaliphatic containing compounds, and mixtures thereof.

14. The method of claim 13 wherein the mixture of reactive compounds comprises at least one aliphatic compound and at least one other compound selected from the group consisting of aromatic containing compounds, cycloaliphatic containing compounds, and mixtures thereof.

15. The method of claim 14 wherein the at least one other compound is present as a mixture of aromatic containing compounds and cycloaliphatic containing compounds.

16. The method of claim 14 wherein the at least one other compound is not a mixture of aromatic containing compounds and cycloaliphatic containing compounds.

17. The method of claim 16 wherein the at least one other compound is present as a mixture of the isomers of either aromatic containing compounds or cycloaliphatic containing compounds.

18. The method of claim 13 wherein the mixture of reactive compounds comprises at least one aromatic containing compound and at least one other compound selected from the group consisting of aliphatic compounds, cycloaliphatic containing compounds, and mixtures thereof.

19. The method of claim 18 wherein the at least one other compound is present as a mixture of aliphatic compounds and cycloaliphatic containing compounds.

20. The method of claim 18 wherein the at least one other compound is not a mixture of aliphatic compounds and cycloaliphatic containing compounds.

21. The method of claim 20 wherein the at least one other compound is present as a mixture of the isomers of either aliphatic compounds or cycloaliphatic containing compounds.

22. The method of claim 13 wherein the mixture of reactive compounds comprises at least one aliphatic compound, at least one aromatic containing compound, and at least one cycloaliphatic containing compound.

23. The method of claim 13 wherein reactive component (c) comprises from 3 to 25% by weight aliphatic compounds, 3 to 25% by weight aromatic containing compounds, and 50 to 94% by weight cycloaliphatic containing compounds, all based on the total weight of reactive component (c).

24. The method of claim 23 wherein reactive component (c) comprises from 3 to 18% by weight aliphatic compounds, 5 to 23% by weight aromatic containing compounds, and 55 to 85% by weight cycloaliphatic containing compounds, all based on the total weight of reactive component (c).

25. The method of claim 24 wherein reactive component (c) comprises from 5 to 10% by weight aliphatic compounds, 10 to 20% by weight aromatic containing compounds, and 60 to 70% by weight cycloaliphatic containing compounds, all based on the total weight of reactive component (c).

26. The method of claim 1 wherein the nonfunctional part of reactive component (c) comprises 36 to 54 carbons.

27. The method of claim 26 wherein the nonfunctional part of reactive component (c) comprises 36 carbons.

28. The method of claim 1 wherein reactive component (c) has from 2 to 6 functional groups (ii).

29. The method of claim 28 wherein reactive component (c) has 2 functional groups (ii).

30. The method of claim 1 wherein the functional groups (ii) of reactive component (c) are selected from the group consisting of hydroxyl, carbamate, carboxyl, epoxy, cyclic carbonate, amine, aldehyde, aminoplast functional groups, urea, isocyanate (blocked or unblocked), and mixtures thereof.

31. The method of claim 30 wherein the functional groups (ii) of reactive component (c) are selected from the group consisting of hydroxyl, carbamate, carboxyl, epoxy, isocyanate, aminoplast functional groups, and mixtures thereof.

32. The method of claim 31 wherein functional groups (ii) of reactive component (c) are selected from the group consisting of hydroxyl, carbamate and mixtures thereof.

33. A method of making an acrylic polymer, comprising,
providing a reactant mixture (a) comprising one or more ethylenically unsaturated monomers,
providing a solvent mixture (b) comprising a reactive component (c) which is substantially free of any heteroatoms and is not a crystalline solid at room temperature and comprises (i) a non functional part comprising from 18 to 72 carbon atoms, and (ii) at least two functional groups, and polymerizing the reactant mixture (a) under free radical polymerization conditions in the solvent mixture (b) to provide a mixture (d) of an acrylic polymer (a') in solvent mixture (b), wherein reactive component (c) is substantially inert in the free radical polymerization of reactant mixture (a) and is substantially free of any functional groups reactive with reactant mixture (a).

34. A method of making a polymer comprising providing a reactant mixture (a) comprising one or more conponents, providing a solvent mixture (b) comprising a reactive component (c) which is substantially free of any heteroatms is not a crystallline solid at room temperature, and comprises (i) from 12 to 72 carbon stains, and (ii) at least two functional groups, and (iii) at least two structures that are one of:

(I) at least one aliphatic structures of reactive component (c), and at least one structure selected from the group consisting of aromatic-containing structures for reactive component (c), and mixtures thereof, (II) at least one aromatic-containing structure for reactive component (c) and at least one structure selected from the group consisting of aliphatic structures for reactive component (c), cycloaliphatic-containing structures for reactive component (c), and mixtures thereof, or (III) at least one cycloaliphatic-containing structure for reactive component (c) and at least one structure selected from the group consisting of aliphatic structures for reactive component (c), aromatic-containing structures for reactive component (c), and mixtures thereof, and subjecting the reactant mixture (a) in the solvent (b) to polymerization conditions sufficient to polymerize reactant mixture (a) to provide a mixture (d) of a polymer (a') in solvent mixture (b), wherein reactive component (c) under the polymerization conditions is substantially nonreactive: (I) with the components of reactive mixture (a), (2) in the polymerization of reactant mixture (a) and (3) with the polymer (a').

* * * * *